United States Patent

Hallman et al.

[11] Patent Number: 6,014,175
[45] Date of Patent: Jan. 11, 2000

[54] PROCESS FOR PREPARATION OF SAMPLED VALUES

[75] Inventors: Thomas Hallman, Leinfelden-Echterdingen; Heinz Goeckler, Backnang; Klaus Hildebrand, Berglen, all of Germany

[73] Assignee: Robert Bosch GmbH, Stuttgart, Germany

[21] Appl. No.: 08/907,436

[22] Filed: Aug. 8, 1997

[30] Foreign Application Priority Data

Aug. 8, 1996 [DE] Germany .................. 196 32 036

[51] Int. Cl.$^7$ .................. H04N 7/04; H04N 7/06
[52] U.S. Cl. .................. 348/469; 348/469; 348/471; 375/242; 375/243
[58] Field of Search .................. 348/495, 469, 348/471, 472, 682; 375/242, 243; 341/93; H04N 7/04, 7/06

[56] References Cited

U.S. PATENT DOCUMENTS 5,282,153   1/1994   Bartkowiak et al. .................. 364/176
5,327,542   7/1994   Sakamura et al. .................. 395/400
5,347,480   9/1994   Asghar et al. .................. 364/736

FOREIGN PATENT DOCUMENTS 44 15 288 A1   11/1995   Germany .

Primary Examiner—Nathan Flynn
Assistant Examiner—Vivek Srivastava
Attorney, Agent, or Firm—Michael J. Striker

[57] ABSTRACT

For preparation of sampled values represented as two's complements, a two's complement clipping of the least significant bits(LSB) occurs. In place of the removed bits (LSB), the synchronization information (s(k)) is added with an average value depending on the quantization step. No dominant spectral lines for frequencies f greater than zero are permitted to occur in the useful spectrum for this synchronization information. Errors which are caused by removal of the least significant bits and by addition of the synchronization information are largely compensated by these features.

9 Claims, 3 Drawing Sheets

PROCESS FOR PREPARATION OF SAMPLED VALUES

BACKGROUND OF THE INVENTION

The present invention relates to a process for preparation of sampled values or picture elements as two's complements, especially for transmission purposes.

A process for preparation of data, especially of digitized television channel signals or television signal beams, is described in German Patent Application DE 44 15 288 A1. Data which are present as parallel partial data streams of bits of different significance are replaced by partial data streams in which the least significant bits are periodically replaced by a frame marking. Useful information is thus replaced by additional information which has no essential information content. Because of this, the process can operate at the standard data rate, since no additional transmission work or process steps are required for the synchronization information, especially the frame marking.

Since no multiframe need be formed for the synchronization information, this process can use simpler multiplexer and demultiplexer devices.

SUMMARY OF THE INVENTION

It is an object of the present invention to provide an improved process for preparation of sampled values or picture elements, especially for the purposes of transmission.

According to the invention, the process for preparing sampled values represented in two's complement for transmission purposes, among others, includes:

a) removing least significant bits (LSB) by two's complement clipping; and b) adding synchronization information (s(k)) in place of the least significant bits.

The synchronization information has the following properties an average value of the synchronization information after clipping given by the following formula (1):

$$\overline{s(k)} = (\tfrac{1}{2})(q_2 - q_1) \qquad (1),$$

wherein $q_1$ is the quantization step of the sampled values prior to clipping and $q_2$ is the quantization step of the sampled values after clipping, and the synchronization information s(k) is periodic and has dominant spectral lines for frequencies (f) greater than 0 which are outside the useful spectrum.

It is possible to transmit synchronization information without noticeable quality loss using the process according to the invention. Interference caused by the method steps for the added synchronization information is minimal. If the method according to the invention is not used the circuit expenses increase or especially error compensating features are necessary.

Features of preferred embodiments of the process are described and claimed in the dependent claim appended hereinbelow, for various advantageous applications.

The invention is based on the following knowledge:

A random error with an approximately white noise spectrum arises by removal of a least significant bit from the useful signal. A more or less direct part of the error arises according to how the removal of the LSB is performed. This direct part can cause interference when it is added with other direct parts produced in the entire system to larger values, or when it falls in the middle of the useful band. The direct signal error component is completely eliminated by the structure of the synchronization information according to the invention. The interference lines in the frequency spectrum occurring due to the synchronization information may even fall in the useful spectrum, without that an outside signal spacing is exceeded. No dominant spectral lines must fall in the useful spectrum. The process according to the invention has all the advantages of the process described in German Patent Application DE 44 15 288 A1 with the additional advantage that the added synchronization/frame marking produces no interferences or reduced interferences in comparison to the state of the art.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
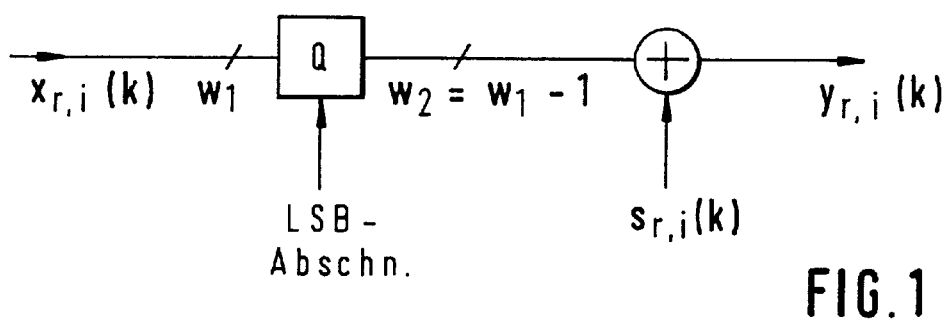
FIG. 1 is a diagrammatic representation showing removal of the least significant bit and addition of synchronization information.

FIG. 1 shows removal of the least significant bits (LSB) from input sampled values $x_{r,i}(k)$ and addition of synchronization information $s_{r,i}(k)$, e.g. a frame marking, at their locations, so that an output signal $y_{r,i}(k)$ is produced. The invention is designed so that the disturbance or interference of x(k) by formation of y(k), so that the synchronization $s_{r,i}(k)=s(k)$ is built in, is minimal.

The indices r and i exist for the respective real and/or imaginary parts of complex sampled values, i.e. sampled values which arise particularly by mixture with a complex carrier.

The sampled values x(k), i.e. the useful signal portions, are represented in two's complement according to the invention. One such representation for digital signals is, for example, described in "Handbook for Digital Signal Processing", Sanjit K. Mitra, James F. Kaiser, John Wiley & Sons, New York, pp. 338 to 341. The removal of the LSB occurs by two's complement clipping and of course in relation to the least significant bit position. The two's complement clipping described in German Patent Application DE 44 40 508 A1 includes removal of the upper bits and not the LSB. The word length $w=w_1$ of the sampled word is reduced to $w_2=w_1-1$ by the two's complement clipping process. The two's complement clipping occurs without additional steps for reducing the arising DC (direct) component $$\epsilon_{DC} = -(\tfrac{1}{2})(q_2 - q_1), \qquad (2)$$

wherein $q_1 = 2^{-(w_1-1)}$ is the quantization step for the input signal x(k) prior to removal of the LSB (word length $w_1$) and $q_2 = 2^{-(w_2-1)}$ the quantization step after removal of the least significant bit(word length $w_2 = w_1 - 1$), also $q_2 = 2q_1$.

The added synchronization information s(k) has an average value (direct component) of magnitude, $$\delta_{DC} = \overline{s(k)} = (1/2)(q_2 - q_1) = -\epsilon_{DC}, \quad (1)$$

which compensates the DC-error component of the LSB removal. The synchronization information can be added to the real and imaginary parts using complex sampled values. The added synchronization information s(k) is periodic so that the dominant spectral lines of the signal spectrum $$S(n) = q_1 * (1/N)$$

$$S(n) = q1 * (1/N) \sum_{k=0}^{N-1} s(k)\exp\{-j(2\pi/N)kn\}, \quad (3)$$

$$s(k)\exp\{-j(2\pi/N)kn\}, \quad (3)$$

are outside the useful spectrum, whereby $S(0) = \delta_{DC}$ and N is the period length of the bit sequence s(k); that is, s(k−N)= s(k).

The least significant bit LSB is replaced thus by a 1-bit synchronization information s(k), whereby $q_2 = 2q_1$. The signal period of the synchronization of the even length N is advantageously of the form $s(k) = q_1 (a_1, a_2, a_3, \ldots a_N)$, whereby $a_i \in \{0,1\}$ for all $i \in N$ and wherein the signal period contains equally many zero values ($a_i = 0$) and one values ($a_i = 1$), namely respectively N/2.

Figure 2:
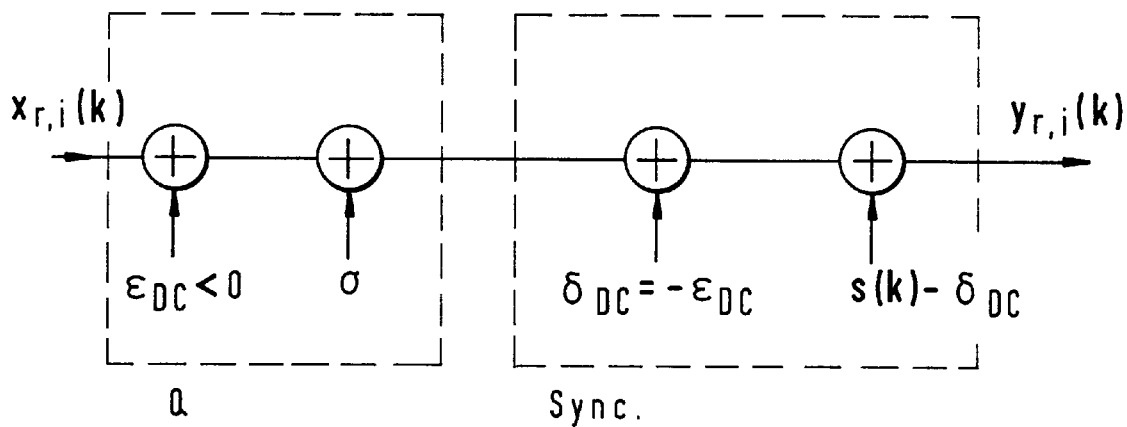
FIG. 2 is a diagrammatic representation showing an error model of the quantization for removal of the least significant bit and the addition of synchronization information.

FIG. 2 shows an error model for the quantization Q for removal of the LSB and the added synchronization information s(k) in the time domain, wherein a characterizes the standard deviation of the random error occurring during removal of the LSB.

Figure 3:
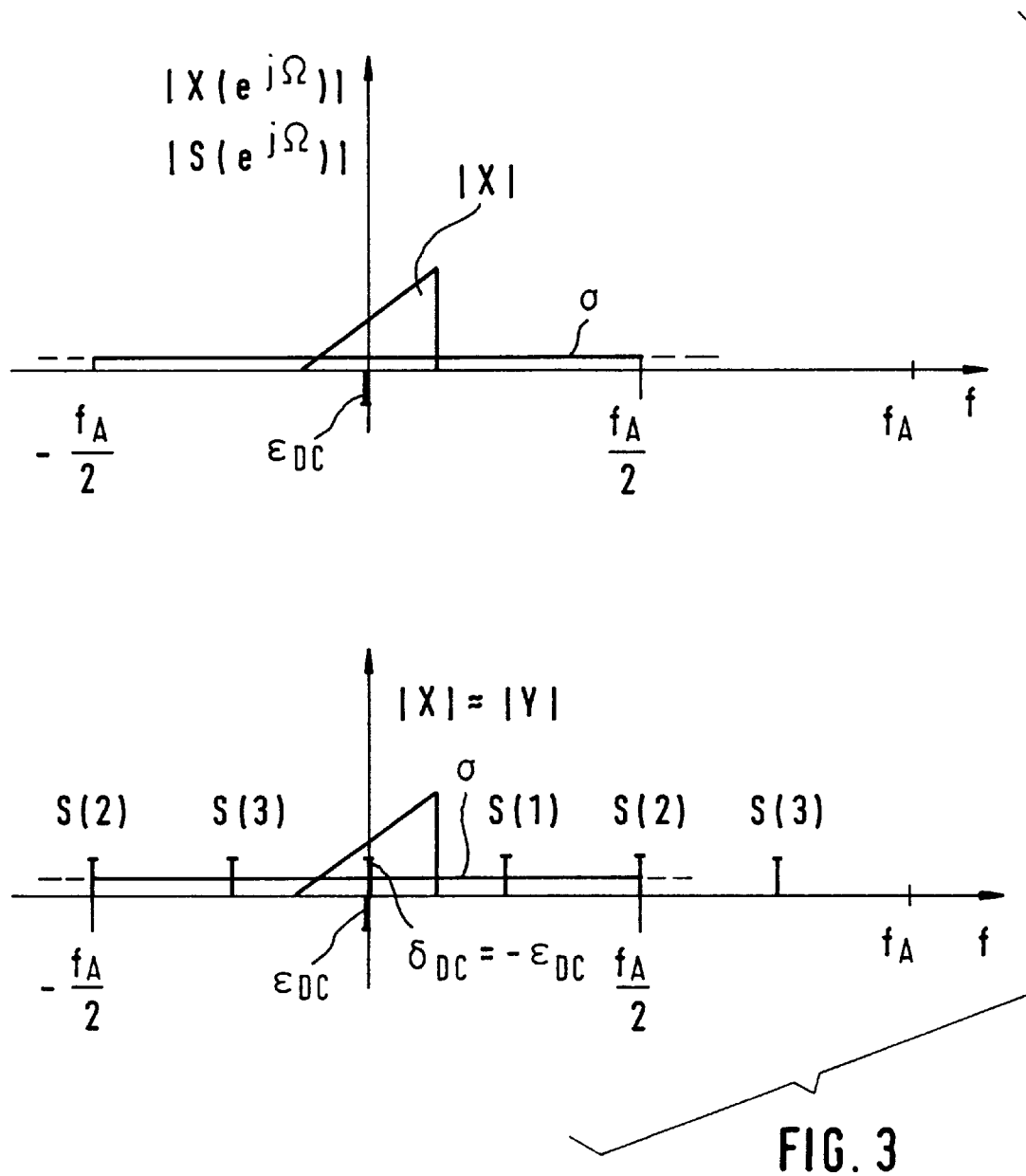
FIG. 3 is a corresponding diagrammatic representation in the frequency domain.

FIG. 3 show the corresponding representation in the frequency domain with a period length N=4 for the synchronization information. As seen from FIG. 3, all spectral lines except for $S(0) = \delta_{DC}$ fall outside the useful spectral range |X| and/or |Y|. The sampling frequency for production of the sampled values or picture elements is indicated in FIG. 3 with $f_A$. For the DC-component $\epsilon_{DC}$ $$\epsilon_{DC} = 1/2(q_2 - q_1) = -(1/2)q_1. \quad (4)$$

Figure 4:
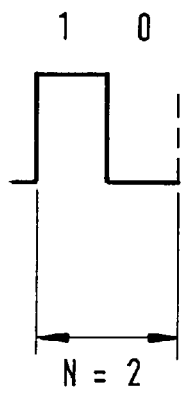
FIGS. 4 and 5 are illustrations of examples of the synchronization signals according to the invention.

Subsequently examples are provided for the synchronization signal s(k) which satisfies the above-described conditions (error compensation for the direct component). The signal illustrated in FIG. 4 is a 10 series with a period length N=2, whereby $$(1/q_1)*s(k): \ldots 1,0,\ldots ; s(0) = 1, s(1) = 0 \quad (5)$$

and for the spectral lines:

$$S(0) = q_1/2 = S(1) \quad (6)$$

Figure 5:
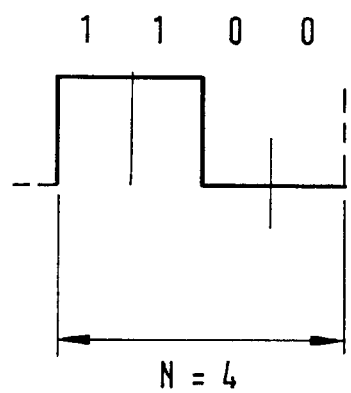

The synchronization signal according to FIG. 5 has a period length N=4 and comprises the sequence 1100 with:

$$s(0) = s(1) = q_1; s(2) = s(3) = 0 \quad (7)$$

and $$S(0) = q_1/2 = \delta_{DC} = -\epsilon_{DC} \quad (8)$$

$$S(1) = (q_1/4)(1-j); |S(1)| = q_1/2\sqrt{2} \quad (9)$$

$$S(2) = 0 \quad (10)$$

$$S(3) = S(1) = (q_1/4)(1+j) \quad (11)$$

$$|S(3)| = q_1/2\sqrt{2} \quad (12)$$

For a further sequence of synchronization signals according to the invention:

$$s(0) = s(1) = s(2) = q_1 \quad (13)$$

$$s(3) = s(4) = s(5) = 0, N=6, \delta_{DC} = q_1/2 \quad (14)$$

or $$s(0) = s(1) = s(3) = q_1 \quad (15)$$

$$s(2) = s(4) = s(5) = 0 \quad (16)$$

$$\delta_{DC} = q_1/2 \quad (17)$$

It is essential in regard to the actual expenses that the synchronization signal according to the analysis must not be replaced again on the receiver side by another—improved—signal, since the synchronization signal is exactly selected so that it is optimum for the entire system properties.

Since it is now to be established how the synchronization information is to be added in an optimum manner (with minimum degradation), how much residual degradation still remains must be determined.

The following equation (18) for the error $\sigma^2$ because of removal of the LSB results for the two's complement ES ($q_2 = 2q_1$):

$$\sigma^2 = (1/12)(q_2^2 - q_1^2)$$

$$= (1/12)(q_2 - q_1)(q_2 + q_1)$$

$$= \{q_1^2/12\}(\{q_2/q_1\} - 1)(\{q_2/q_1\} + 1) = q_1^2/4 \quad (18)$$

The variance is equal to the scope of the error $\sigma^2 = q_1^2/4 = \epsilon_{DC}^2$ which is equal to the scope of the DC-error component; the latter being however completely eliminated by the form of the synchronization signal according to the invention.

The synchronization information prepared according to the invention can advantageously be used for a transmission system with digitized television channel signals or television channel signal beams, for example for the transmission system set forth in German Patent Application DE 44 15 288 A1.

Figure 6:
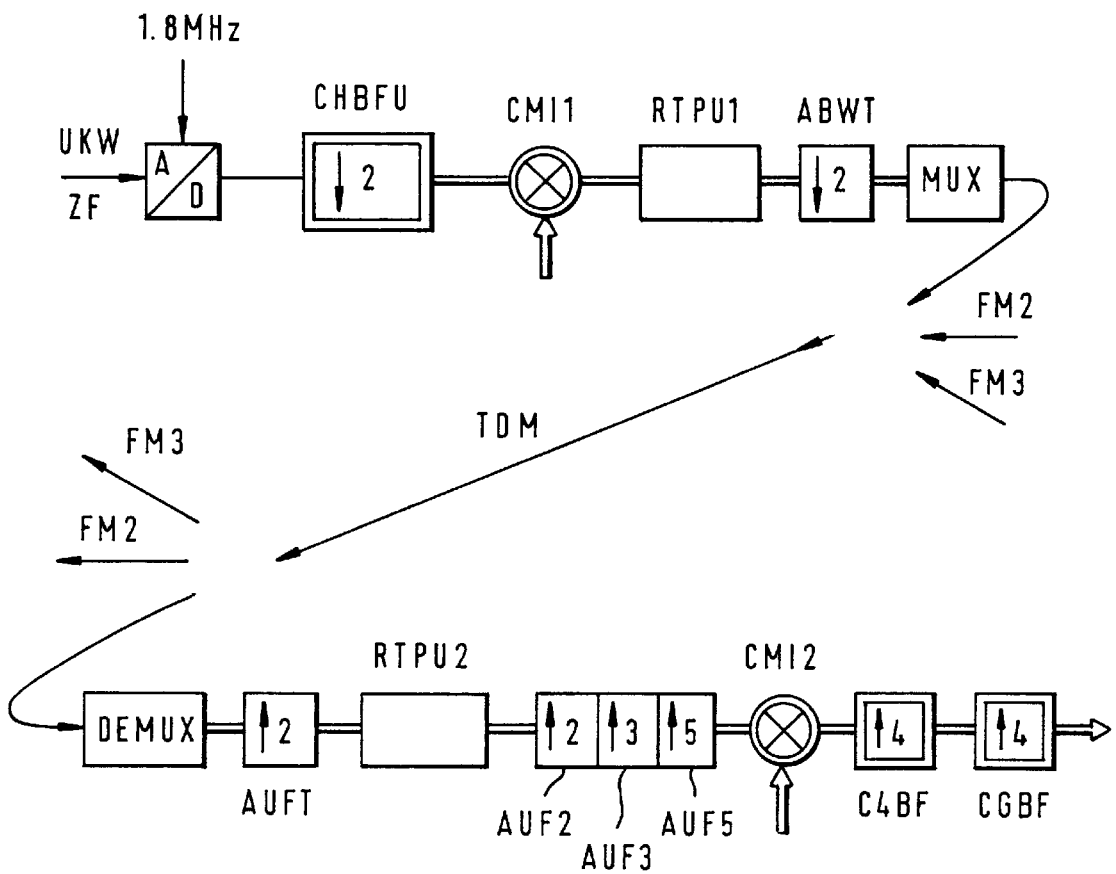
FIG. 6 is a block diagram of a circuit for a time-division multiplex transmission system of UKW-FM signals with the synchronization information according to the invention.

Subsequently the use of the methods of the invention in a time-division multiplex-transmission system of UKW-FM signals is set forth. The block circuit diagram for this transmission system is shown in FIG. 6. The UKW signals supplied in ZF configuration are sampled with a sampling frequency $f_A = 1.8$ MHz and digitized. This process is illustrated in the block circuit diagram by an A/D converter. It is connected to a half band filter CHBFU with a sampling rate conversion (reduction of the sampling rate by about a factor of 2), which permits the conversion of a real input signal into a complex output signal. This type of half band filter is described for example in European Patent Document 250 926 A2. The filter length N is advantageously selected so that N=27. A mixer CMI1 for complex signals for reducing mixing of intermediate frequency signals and a downstream filter RTPU1 for subsequent channel selection, which acts simultaneously as an initializing filter, are connected downstream of the half band filter. On account of the subsequent down sampling ABWT of about a factor 2 the adjacent channel selection must be completely performed here, since the adjacent channel is not centered at $f_A/2 = 471$ kHz. Here N=59 is selected as the filter length. In the subsequent multiplexer MUX the LSB is replaced by the synchronization information s(k) as described above. The interlacing of the real and imaginary part of the complex signal for transmission occurs in this multiplexer. The main features of the structure of this multiplexer are described in German Patent Document DE 44 15 288 A1. The transmission according to the time-division multiplex process, for example over a light guide after suitable processing, occurs together with the FM channels FM2, FM3, . . . .

A subsequent receiver side signal processing with a demultiplexer DEMUX and an upward sampler AUFT. Because of the foregoing up scanning an anti-imaging filter RTPU2 is provided. A half band filter, for example according to WO 88/06381 A1 (complex input signal-complex output signal), is suitable for that. The following up scanner AUF2, AUF3, AUF5, the complex mixer CMI2 and the complex half band filters C4BF and CGBF with sampling rate converted (factor of 4 respectively for both) provide further suitable signal processing. The complex mixer CMI2 operates with a scanning frequency of 28 MHz and channel specific mixer frequency, which leads to an increased sampling frequency of the output signal of the transmission system of 432 MHz.

A total quantization noise output of $$N=2^{-25}$$

results from an error analysis of this transmission system (FIG. 6). Additional spectral overlapping components arise in the half band filter CHBFU and in the down scanner ABWT because of the sampling rate reduction in the system according to FIG. 6. The resulting signal/noise ratio amounts to 71.5 dB at 100% modulation and 68 dB with small signal modulation. With these values a sufficient reserve is present for an external signal level. The quantization noise output is increased by addition of the synchronization information of only about $\Delta N=\{1/3\}2^{-28}$ in the present embodiment with $w_1=15$ bits, whereby the above-mentioned signal-to-noise ratio remains unchanged to a good approximation. Indeed according to the invention the direct component error is completely eliminated besides. It is thus possible to selected the period length very much larger than 2 so that the plurality of spectral lines are in the useful signal region with the exception of the dominant spectral lines.

As previously mentioned, the synchronization information can be added to the real part or the imaginary part of the complex signal x(kT) or both signal components. In the latter case the added synchronization signals can identically be $s_r(k)=s_i(k)=s(k)$, whereby k is integral. The added synchronization signals can also be equal and phase-shifted with respect to each other:

$$s_r(k-k_0)=s_i(k) \text{ for } k_0 \neq 0, \tag{19}$$

or can be different:

$$s_r(k) \neq s_i(k-k_0) \text{ for all } k_0. \tag{20}$$

From the considerations set forth, for example, the real and imaginary part can be completed with equal synchronization sequences, which can be phase-shifted relative to each other as required.

When signals prepared according to the invention are transferred together into a time-division multiplexer, as in the above-described transmission system for UKW-FM signals, wherein these signals themselves can be real or complex valued, the above-described features for individual time division multiplex components can similarly be employed, or only partially employed.

The disclosure in German Patent Application 196 32 036.4 of Aug. 8, 1996 is incorporated here by reference. This German Patent Application describes the invention described hereinabove and claimed in the claims appended hereininbelow and provides the basis for a claim of priority for the instant invention under 35 U.S.C. 119.

While the invention has been illustrated and described as embodied in a process for preparation of sampled values, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A process for preparing sampled values represented as two's complements for:

a) removing least significant bits (LSB) by two's complement clipping;

b) adding synchronization information (s(k)) in place of the least significant bits removed by the two's complement clipping in step a), wherein an average value of the synchronization information after clipping is given by the following formula (1)

$$\overline{s(k)}=(1/2)(q_2-q_1) \tag{1},$$

wherein $q_1$ is a quantization step of the sampled values prior to clipping and $q_2$ is a quantization step of the sampled values after clipping, and the synchronization information (s(k)) is periodic and has dominant spectral lines for frequencies (f) greater than zero which are outside a useful spectrum thereof.

2. The process as defined in claim 1, wherein one of the least significant bits (LSB) is replaced by a 1-bit synchronization information entity (s(k)), whereby $q_2=2q_1$.

3. The process as defined in claim 1, wherein the synchronization information has a signal period of the form $s(k)=q_1(a_1, a_2, a_3, \ldots .a_N)$, wherein $a_i \in \{0,1\}$ for all $i \in [1,N]$ and wherein the signal period contains equally many zero values, wherein $a_i=0$, and one values, wherein $a_i=1$.

4. The process as defined in claim 1, wherein during the adding of the synchronization information, the synchronization information is added to at least one of a real part and an imaginary part of the sampled values when said sampled values are complex.

5. The process as defined in claim 1, wherein during the adding of the synchronization information, respective synchronization information entities which are phase-shifted relative to each other, but otherwise identical, are added to a real part and an imaginary part of the sampled values when the sampled values are complex.

6. The process as defined in claim 1, wherein during the adding of the synchronization information, identical synchronization information is added to both real and imaginary parts of the sampled values when the sampled values are complex.

7. The process as defined in claim 1, wherein during the adding of the synchronization information, different synchronization information is added to respective real part and imaginary parts of the sampled values when the sampled values are complex.

8. The process as defined in claim 1, wherein the least significant bits (LSB) are a part of a digitized television channel signal and the process is used for digitized television channel signals or television channel signal beams.

9. The process as defined in claim 1, wherein the least significant bits (LSB) are a part of a UKW-FM signal in a time-division transmission system and the two's complement clipping and the adding of the synchronization information (s(k)) are performed on the UKW-FM signal of a time-division multiplex transmission system.

* * * * *